(12) United States Patent
Studholme

(10) Patent No.: US 6,433,107 B1
(45) Date of Patent: *Aug. 13, 2002

(54) FIBER-FORMING POLYAMIDE WITH CONCENTRATE OF POLYAMIDE AND SULFONATED AROMATIC ACID

(75) Inventor: Matthew B. Studholme, Abington, VA (US)

(73) Assignee: Prisma Fibers, Inc., Bristol, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/649,017

(22) Filed: Aug. 28, 2000

Related U.S. Application Data

(63) Continuation-in-part of application No. 09/190,143, filed on Nov. 12, 1998, now Pat. No. 6,133,382, which is a continuation-in-part of application No. 08/522,123, filed on Aug. 31, 1995.

(51) Int. Cl.$^7$ .......................... C08L 67/02; C08L 77/02; C08L 77/06
(52) U.S. Cl. .................... 525/432; 8/115.56; 252/8.61; 428/97; 525/425; 528/295; 528/321
(58) Field of Search ................................ 525/425, 432; 528/295, 321; 8/115.56; 252/8.61; 428/97, 474.4, 480

(56) References Cited

U.S. PATENT DOCUMENTS

| | | |
|---|---|---|
| 3,142,662 A | 7/1964 | Huffman |
| 3,184,436 A | 5/1965 | Magat |
| 3,296,204 A | 1/1967 | Caldwell |
| 3,365,427 A | 1/1968 | Ballentine et al. |
| 3,389,549 A | 6/1968 | David .......................... 57/140 |
| 3,409,596 A | 11/1968 | Unger et al. |
| 3,440,226 A | 4/1969 | Crovatt |
| 3,448,087 A | 6/1969 | Ballentine et al. |
| 3,542,743 A | 11/1970 | Flamand |
| 3,553,286 A | 1/1971 | Murata et al. |
| 3,565,910 A | 2/1971 | Elbert et al. |
| 3,640,942 A | 2/1972 | Crampsey |
| 3,846,507 A | 11/1974 | Thomm et al. |
| 3,853,820 A | * 12/1974 | Vachon ....................... 528/301 |
| 3,898,200 A | 8/1975 | Lofquist |
| 3,923,749 A | 12/1975 | Howell |
| 4,083,893 A | 4/1978 | Lofquist et al. |
| 4,097,546 A | 6/1978 | Lofquist |
| 4,303,577 A | 12/1981 | Ridgway et al. |
| 4,340,519 A | * 7/1982 | Kotera et al. ................ 525/444 |
| 4,374,641 A | 2/1983 | Burlone .......................... 8/557 |
| 4,391,968 A | 7/1983 | Merani et al. .............. 528/321 |
| 4,579,762 A | 4/1986 | Ucci ............................ 428/95 |
| 4,680,212 A | 7/1987 | Blyth et al. ................... 428/97 |
| 4,780,099 A | 10/1988 | Greschler et al. ............ 8/115.6 |
| 5,108,684 A | 4/1992 | Anton et al. ............. 264/176.1 |
| 5,141,692 A | 8/1992 | Shridharani et al. ...... 264/210.6 |
| 5,145,487 A | 9/1992 | Hangey et al. ................ 8/557 |
| 5,164,261 A | 11/1992 | Windley .................... 428/364 |
| 5,236,645 A | 8/1993 | Jones .......................... 264/78 |
| 5,279,889 A | 1/1994 | Asrar ........................ 428/458 |
| 5,820,982 A | * 10/1998 | Salsman ..................... 528/279 |
| 5,834,089 A | * 11/1998 | Jones et al. ................ 524/538 |
| 6,117,550 A | * 9/2000 | Studholme ................. 428/392 |
| 6,133,382 A | * 10/2000 | Studholme ................. 525/425 |

FOREIGN PATENT DOCUMENTS

| | | |
|---|---|---|
| DE | 4309436 | 9/1994 |
| EP | 035051 | 9/1981 |
| EP | 373655 | 6/1990 |
| EP | 421971 | 4/1991 |
| EP | 470614 | 2/1992 |
| EP | 517203 | 2/1992 |
| GB | 901938 | 7/1962 |
| GB | 901939 | 7/1962 |
| GB | 1205563 | 9/1970 |
| JP | 59-36155 | * 2/1984 |
| JP | 60-209014 | * 10/1985 |
| JP | 5-086287 | 4/1993 |
| JP | 5-140499 | * 6/1993 |
| JP | 6-340610 A | * 12/1994 |
| WO | 92/08828 | 5/1992 |
| WO | 93/19239 | 9/1993 |
| WO | 96/17982 | 6/1996 |

OTHER PUBLICATIONS

Derwent accession No. 94–303668/38 for German Patent No. 4,309,436 Sandoz–Patent–Gmb H, Sep. 1994.

Tokida et al., "Diffusion of m–sulfobenzoic acid in nylon 6." Chemical abstractes accession No. 1984:491864, Angew. Makromol. Chem., vol. 122(1984), pp. 11–19.*

Tokida et al., "Sorption of m–sulfobenzoic acid in nylon 6." Chemical abstracts accession No. 1984:491959, Angew. Makromol. Chem., vol. 122(1984), pp. 1–9.*

* cited by examiner

*Primary Examiner*—Robert E. L. Sellers
(74) *Attorney, Agent, or Firm*—Dykema Gossett PLLC

(57) ABSTRACT

A fiber-forming polyamide composition including a combination of a fiber-forming polyamide with a concentrate having one or more sulfonated aromatic acid reagents in a thermoplastic carrier resin. The concentrate preferably comprises an alkali metal salt of 5-sulfoisophthalic acid, preferably carried in a matrix comprising one or more thermoplastic polyesters or polyamides.

19 Claims, No Drawings

FIBER-FORMING POLYAMIDE WITH CONCENTRATE OF POLYAMIDE AND SULFONATED AROMATIC ACID

CROSS-REFERENCE TO RELATED APPLICATION

This application claims priority of application Ser. No. 08/522,123, filed Aug. 31, 1995, and of application Ser. No. 09/190,143, filed Nov. 12, 1998, U.S. Pat. No. 6,133,382, of which it is a continuation-in-part, both of which are incorporated herein by reference.

BACKGROUND OF THE INVENTION

1. Field of the Invention

The invention relates to stain resistant and soil resistant polyamide compositions and fibers formed therefrom, the fibers being particularly useful in the manufacture of textile articles, carpets and floorcoverings.

2. The Prior Art

Articles of manufacture based on polyamide fibers, particularly apparel, textile fabrics such as for upholstered furniture, wallcoverings and carpeting, are subject to staining when brought into accidental contact with a variety of foods, drinks, and other substances, which contain particular colorant species. The uptake of acid dye stains from, for example, soft drinks, is a particularly troublesome occurrence for polyamide fibers due to the availability within said polyamide fibers of acid dye receptor sites such as amine end groups and amide linkages. The problem is of particular significance when the fibers are uncolored, or are colored by the technique known as "solution dyeing", i.e., where the coloration is imparted by the addition of pigments to the polymer melt prior to spinning. In both these cases, the acid dye receptor sites are not neutralized by acid dyes used in the alternative bath dyeing methods used to color fibers or fiber containing articles of manufacture.

Several approaches have been suggested for enhancing the resistance of polyamide fibers to accidental staining, particularly by acid dyes. One approach is to apply a so-called topical "stainblocker" coating to the surface of the polyamide fibers to prevent access to the acid dye sites therein by the acid dye staining compositions. The main type of topical stainblockers known to those skilled in the art is sulfonated aromatic condensates (SAC). There are a number of patents covering SAC and their use; examples of the method include U.S. Pat. No. 5,145,486 (to Ciba-Geigy), U.S. Pat. No. 4,680,212 (to Monsanto), and U.S. Pat. No. 4,780,099 (to DuPont). Polyamides that are topically coated with SAC have the disadvantage that the said topical coating provides only temporary protection, as it can be rendered ineffective, or removed, during use and maintenance. In the case of carpet fibers so treated, the coating can be worn away by traffic across the carpet, and may be also removed by cleaning. Commercial and institutional carpeting tends to be cleaned regularly with relatively harsh, alkaline-based cleaning agents, and these in particular may easily remove the SAC coating. In addition to actual removal of the protective coating, SAC generally have inferior resistance to light, oxides of nitrogen, and thermal ageing, the last being a particular problem where underfloor heating is involved. Also, the base color of SAC is not colorless, and thus may change the shade of the color imparted to the base fiber.

Another approach for enhancing the resistance of polyamide fibers to acid dye staining is to form the fibers from polyamides prepared by copolymerizing monomers, some of which contain sulfonate moieties. Typical of such systems are those disclosed in U.S. Pat. No. 3,542,743 (to Monsanto), U.S. Pat. No. 3,846,507 (to Union Carbide), U.S. Pat. No. 3,898,200 (to Allied Chemical Corporation), U.S. Pat. No. 4,391,968 (to Montedison), U.S Pat. No. 5,108,684 (to DuPont) and U.S Pat. No. 5,164,261 (to DuPont), and European Patent 517 203 (to BASF). All of these prior art patents teach the initial formation of a sulfonated copolyamide in a polymerization stage where the sulfonate containing co-monomer becomes an integral part of the polyamide to be used as the base polymer for fiber spinning. All of these patents are concerned with modifying the dyeing or stain resistance characteristics of the polyamide.

Fibers are generally prepared from polyamides by melt spinning. Sulfonate-containing polyamides generally have higher melt viscosities than non-sulfonate-containing polyamides for equivalent relative solution viscosities, which limits the extent of polymerization that can be practically achieved in batch autoclave reaction vessels due to retardation thereby of the rate of polymerization, as well as hindrance of effective discharge of the polymerized melt from the reactor. In addition, the presence of sulfonates which have surfactant properties promotes excessive foaming during the melt polymerization process, resulting in poor agitation of the reaction mixture and non-uniformity of product. An additional disadvantage associated with sulfonate-containing polyamide copolymers is that they are generally more difficult to dry than sulfonate-free polyamides due to the hygroscopic nature of the sulfonate groups.

Yarns having different depths of color require different levels of protection against staining. Thus, light shaded colors show the presence of stains more than darker colors. It would be advantageous, therefore, to be able to provide different levels of stain resistance to polyamides depending on the ultimate yarn color without having to provide a separate polyamide feedstock for optimum formulation of each yarn. Attempts have been made to achieve this goal through the use of sulfonated copolyamides containing high levels of sulfonate moieties, which are themselves added to fiber-forming polyamides to provide an overall sulfur content within the range demonstrated in the prior art to be effective in providing stainblocking to the final fibers. For example U.S. Pat. No. 3,846,507 (to Union Carbide Canada) utilises a copolymer of isophthalic acid, hexamethylene diamine and 5-sulfoisophthalic acid with high sulfur content, which is then compounded into fiber-forming polyamide to produce a fiber with stain resisting properties. Similar high sulfur content copolyamides are also claimed in U.S. Pat. No. 5,889,138 (to Solutia Inc.). However, while providing a partial answer at least to the need to provide simpler routes towards polyamide-based fibers with variable stainblocker levels, the above methods still utilise sulfonated copolyamides, with all the aforementioned disadvantages of such species. In a similar vein to the above two references, PCT Application 96/17982 (to Monsanto) again suggests the use of highly sulfonated copolymers as additives for stainblocking polyamides, but in this case uses non-polyamide copolymers. In this case the problems of manufacture of the said copolymers will be the same as those encountered with sulfonated copolyamides, along with the same high hygroscopicity; however, in addition to these problems, such an approach will also introduce the problems of compatibility between different classes of polymer, which are well known to those skilled in the art.

In addition to the problems of staining of polyamide fibers, soiling of polyamide fibers is also an issue. Fibers used in textile, carpet and flooring applications are most preferably low in soil pick-up, i.e. the fiber does not attract soil, and secondly the fiber should be easy to clean once it is soiled. Soil proofing of polyamides typically involves one of two approaches. Firstly, a coating may be placed on the fiber which is "sacrificial" in nature, i.e. it is designed to pick up soil, but then must be removed in a cleaning process. Starch is a well known and long established example of this method. Such an approach has the drawback that the fiber needs to be recoated after each cleaning to maintain its soil resistance. The second approach to soil proofing is the use of a different type of coating to change the surface energy or hydrophilic/hydrophobic balance of the polyamide, thus making it less attractive to soil. Fluorinated compounds are the most favoured species in this area, applied as a topical coating to the fiber. The fluorochemical compounds are coated onto the fiber to prevent or reduce the wetting of the surface by minimising the contact between the fiber surface and substances that can soil the fiber, making the substance easier to remove. Examples of patents in this area include U.S. Pat. Nos. 3,816,167, 3,896,035, RE 30 337 and U.S. Pat. No. 4,043,964 (all assigned to 3M). The use of topical soilproofing coatings suffers from similar disadvantages to SAC, in that they can be removed from the carpet during use, routine maintenance and cleaning.

It is an object of the present invention to provide a novel and highly advantageous approach to imparting stain resistance to fibers formed from polyamides. It is yet another object of the present invention to provide stain resistant polyamide fibers with soil resistance in that they have low soil attraction properties, and if soiled, are then easy to clean.

SUMMARY OF THE INVENTION

According to the present invention, acid dye stain-resistant and soil resistant polyamide fibers are formed from a polyamide composition comprising a fiber-forming polyamide and a concentrate consisting essentially of a sulfonated reagent compounded with a thermoplastic carrier resin, the polyamide fibers being advantageously formed by melt spinning, drawing and optionally texturing the drawn yarn. The invention includes the polyamide composition, the method of its manufacture and the articles of manufacture produced from the fibers of the invention, particularly apparel, textile articles, carpets and floorcoverings.

DETAILED DESCRIPTION OF THE INVENTION

The terms below have the following meanings herein, unless otherwise noted:

"Reagent" refers to a chemical compound, or combination of chemical compounds, which associates (as that term is defined below) with the free acid dyeable sites in a fiber-forming polyamide to thereby render them unavailable for association with an acid dye, which reagent is itself incapable of associating with or taking up an acid dye.

"Associates" or "association" refers to the physical interaction which takes place between the reagent and the free acid dye sites in the polyamide which results in prevention of taking up of the acid dye by the polyamide, i.e. staining. Such physical interaction may take the form, for example, of one or more of the following—salt formation, hydrogen bonding, dipole-dipole interaction, Van der Waals forces and co-ordination complexation.

"Acid dye stain" refers to any substance or combination of substances which functions as an acid dyestuff by reacting or associating with available free acid dye sites in polyamides to substantially permanently color or stain the latter.

"Acid dye sites" refers to those basic chemical groups or sites in polyamides, e.g. amine end groups, amide linkages etc., which react or associate with acid dyes thereby resulting in staining of the polymer.

"Disabling" the acid dye sites from taking up acid dye stains refers to the effect of the association between the reagent and the acid dye sites which renders the latter less capable of associating with acid dyes such as, for example, those found in some soft drinks, tomato-based products, etc., which result in staining.

"Concentrate" refers to a combination consisting of an additive material for inclusion in the final polymeric substance to be spun into fiber, combined with an essentially inert carrier resin, such as a thermoplastic polyamide or polyester. Such combinations consist of a high concentration of the required additive in the carrier resin, the whole being combined with or "let down" into the selected fiber-forming polyamide and spun into a fiber with the desired level of additive therein. Besides the unexpected advantages of this addition method to the present invention, to be explained below, it is generally known in the polymer compounding industry that the use of concentrates of additives confers a number of advantages over the direct addition of low levels of additive substances to polymers. These include control over dispersion of said additives, more accurate weighing of additive into final compound, and, in the case of colored or noxious additives, the ability to carry out addition to the carrier resin in a controlled environment and prevent contamination of apparatus or exposure by hazards to personnel.

The present invention is based on the discovery that optimum levels of resistance to acid dye stain and soiling resistance may be imparted to polyamide fibers by melt compounding a fiber-forming polyamide with a concentrate consisting of a combination of a sulfonated reagent and a thermoplastic carrier resin. The process is carried out subsequent to polymerization of the fiber-forming polyamide, and prior to the formation of the fibers. The invention thereby enables avoidance of the above enumerated disadvantages associated with prior art approaches to providing stain resistant and soilproof polyamide fibers.

The compositions are prepared by initially compounding the reagent with a thermoplastic carrier resin using standard extrusion equipment and techniques as would be known to one ordinarily skilled in the art. The concentrate is then melt compounded with a fiber-forming polyamide in a fiber spinning set-up to produce the desired fiber. Product fibers made according to the invention show durable stain-resistance properties equivalent to those achieved via the prior art methods, without the consequent disadvantages potentially associated with the said prior art methods. The product fibers also feature soil resistance superior to that known from these same prior art methods.

The thermoplastic carrier resin may be any thermally stable melt processable condensation polymer such as a polyester or polyamide, which is compatible with the fiber-forming polyamide, and may be crystalline or amorphous in nature. The resin preferably has a processing temperature of less than 300° C., more preferably less than 270° C. Preferred polyesters for the preparation of the concentrate include, but are not limited to, poly(ethylene terephthalate) known as PET, poly(trimethylene terephthalate) known as PTT, poly(butylene terephthalate) known as PBT, and their copolymers (e.g. poly(ethylene terephthalate-co-isophthalate) or copolyesters of poly(ethylene terephthalate)

and 1,4-cyclohexane dimethanol, known as PETG) and mixtures or blends. Preferred polyamides include, but are not limited to, polyamide 6, polyamide 6,6, polyamide 11, polyamide 12, terpolymers of polyamide 6, 6,6 and 6, 12, and poly(trimethylhexamethylene terephthalamide) (3Me6T). The most preferred polyamides are types that have a lower propensity to degradation during processing in relation to polyamide 66. These most preferred polyamides are polyamide 11, polyamide 12, terpolymers of polyamide 6, 6,6 and 6, 12, and poly(trimethylhexamethylene terephthalamide) (3Me6T). Blends or mixtures of these resins with polyamide 6, polyamide 66, copolymers of polyamide 6 and polyamide 6,6, polyamide 6,12, and polyamide 6,9, or with the polyester resins previously mentioned are also suitable. During development of the present invention it was found that, if the reagent is compounded into either polyamide 6 or 66 in a melt-phase process to produce the concentrate, then substantial degradation of the polyamide carrier resin took place as determined through solution relative viscosity measurement. In addition, the percentage reagent, which could be compounded into the polyamide 6 or 6,6, was limited to about 20% by weight of the total concentrate weight. Product fibers formed by drawing and texturing fiber-forming polyamide when these polyamide 6 or 6,6 based concentrates were added thereto on the fiber spinning line displayed poorer stain resistance.

The reagent is a sulfonated species, or a combination of two or more such species, preferably a colorless sulfonated aromatic compound. Most preferably, the reagent is a derivative of sulfoisophthalic acid; preferably a salt of 5-sulfoisophthalic acid with monovalent or multivalent metal species where the metal is an alkaline or alkaline earth metal; most preferably the reagent is the sodium or lithium salt of 5-sulfoisophthalic acid. Other preferred reagents include sulfobenzoic acid, preferably 3-sulfobenzoic acid or the sodium or lithium salt thereof.

The invention is applicable to any fiber-forming polyamide, or alloys or blends of fiber-forming polyamides. The preferred polyamides are polyamide 6 and polyamide 6,6, copolymers of polyamide 6 and 6,6, polyamide 6,12, terpolymers of polyamide 6, 6,6 and 6,12, polyamide 6,9, polyamide 11, polyamide 12, and mixtures or blends thereof. Most preferably the fiber-forming polyamide is either polyamide 6 or 6,6.

The reagent may be combined with the carrier resin in any suitable form such as powdered, pelletized, compacted, etc. The carrier resin may be employed as a powder, granules or pellets. The reagent and the carrier resin are preferably combined employing a melt extruder and, most preferably, a screw-type extruder, of a design suitable for dispersion and distribution of a solid in a thermoplastic melt. Optimally, a twin-screw extruder of the fully intermeshing type with both screws rotating in the same direction (co-rotating) is employed, although other types may be used such as counter-rotating, partially intermeshing or non-intermeshing types. The extruder preferably has a minimum barrel length to diameter ratio of at least 21:1; however, it will be understood that any suitable ratio may be employed depending upon the parameters of the particular compounding process used. The reagent and the carrier resin are preferably dried prior to melt compounding to a moisture level of less than 5000 ppm. An alternative method of removing water from the components is through devolatilization during the compounding process by the presence of one or more vents on the extruder barrel. The extraction of any water through the vent port is preferably vacuum assisted with a vacuum level of greater than 10 in. Hg and preferably greater than 15 in. Hg. The rate of volatilization can be further assisted through substantially dry nitrogen gas injection through an inlet port located either upstream or downstream of the vent port. A combination of drying and venting may also be used. The reagent and the carrier resin may be fed to the extruder as a blend of the two materials using a single feed hopper or by using separate feed hoppers of a suitable type such as gravimetric or volumetric feeders. When a blend of the materials is used, a double cone blender is preferred for preparation of the blend, although other types of blenders may be used. The extruder screw design may contain feeding, conveying, mixing and/or kneading elements to achieve both dispersive and distributive mixing familiar to those ordinarily skilled in the art of polymer melt processing. The screw design will influence the average dwell time of the compounding mixture in the extruder. In general, the greater the % of the overall screw length of mixing and kneading elements in the screw design the greater the dwell time of the compounding mixture will be in the extruder. The average dwell time in the extruder barrel is preferably between 30 seconds and 4 minutes and is chosen to achieve complete blending while avoiding covalent bonding between the reagent and carrier resin.

The extruder temperature profiles used and the desired melt temperature during the mixing process will depend principally on the carrier resin type and grade chosen. For example, when PET is utilized, the melt temperature preferred is between about 275° C. and about 295° C. and for PBT, the preferred melt temperature is between about 245° C. and about 265° C. For PTT the preferred melt temperature is between about 240° C. and about 260° C. and for PETG, the preferred melt temperature is between about 265° C. and about 285° C. The optimum melt temperature will depend on the grade employed. When the concentrate is produced, the melt emerging from the die of the compounding extruder is cooled and solidified prior to pelletization. Typically, cooling and solidification of the melt is achieved by passing the strands through a water bath prior to be fed to a strand pelletizer. Other types of cooling, solidification and pelletization could also be used, such as the so-called underwater pelletizers.

The concentrate prepared may contain from about 10% by weight up to about 65% by weight of reagent with respect to the total weight of the concentrate; preferably from about 20% to about 50%.

The moisture contents of the concentrate and the fiber-forming polyamide are controlled prior to fiber melt spinning. Controlling moisture levels assists the association between the reagent in the concentrate and the fiber-forming polyamide and enhances the stain resistance of the product fibers. The preferred moisture content of the concentrate prior to melt spinning is less than 700 ppm, and most preferably less than 200 ppm which is most preferably achieved through drying of the concentrate. The concentrate of the invention is easy to dry in comparison with both the low and high sulfur content copolyamides of the prior art. The concentrate is then melt compounded with the moisture level controlled fiber-forming polyamide. The polyamide is preferably dried to a moisture content of less than 1500 ppm, and most preferably less than 1000 ppm.

The amount and ratios of fiber-forming polyamide to concentrate may be varied according to need. One of the advantages of the invention is that the stain resistance of the product fibers can be tailored depending on the yarn shade; darker colors exhibit less staining and so require a lower addition level of reagent in the form of the concentrate. Generally, it is preferred to employ concentrate levels which will result in combinations containing from about 1000 ppm to about 3000 ppm sulfur by weight. The polyamide should have a relative solution viscosity (RV) of greater than 2.0 and preferably greater than 3.1 and less than 4.0. The RV chosen will depend on the spinning method used and the yarn product denier required. The polyamide should also have an amine end group (AEG) level of less than 50 equivalent per $10^6$ g and preferably less than 30 equivalents per $10^6$ g.

The concentrate is mixed with the polyamide in the desired ratio depending on the level of stain resistance required in the fiber product. Such mixing may be carried out in a number of ways. For example the polyamide and the concentrate may be combined in a compounding operation prior to being spun, or may be compounded together directly in the fiber melt spinning stage. The fiber melt spinning process may be carried out in any of the conventional operations familiar to those skilled in the art. Functional additives may also be added during the fiber formation process, including, but not limited to, antioxidants, stabilisers, colorants, processing aids, nucleating agents, antimicrobials, antistatic additives, antiozonants, lubricants, stainproofing agents, soilproofing agents, melt viscosity enhancers, flame retardants, or mixtures thereof. The spun fiber may then be drawn and optionally textured using air-jet texturing or mechanical crimp texturing. Product fibers made according to the invention show durable stain resistant properties equivalent to those produced according to prior art methods. The product fibers have soil resistance that is superior to that of those produced according to prior art methods, without detriment to other critical product properties such as wear resistance (retention of appearance), colorfastness to bleach, UV light and oxides of nitrogen exposure.

Extraction analysis of the fibers of the invention has shown that the reagent is not easily removed from said fibers, and that the reagent appears to be well integrated with the polymer matrix of said fibers, as discussed in the examples given below. This feature of the fibers of the invention is surprising. It is well known to those skilled in the art that low molecular weight, non-polymeric, additives (for example stabilizers and antioxidants) are relatively easily extracted form polymers into which they have been compounded, particularly when the articles of manufacture made therefrom have high surface to volume ratio, as is the case with fibers. In contrast, extraction analysis of the concentrate has indicated that the reagent is essentially chemically unreacted with the concentrate carrier.

Either the fibers or yarns prepared from this invention may be manufactured into novel textiles, carpets and other articles of manufacture requiring polyamides with enhanced resistance to staining by acid dyestuffs or enhanced soiling resistance, according to conventional, well known, methods. The textured yarn is most ideally used to produce a carpet using methods of manufacture known to those ordinarily skilled in the art, including tufting, weaving, bonding, needle-loom and knitting. Detailed descriptions of these methods may be found in pages 134 to 140 of "Synthetic Fiber Materials", edited by H. Brody, published by Longman 1994, the disclosure of which is specifically incorporated by reference.

TEST METHODS

In the examples cited, various test methods are used to evaluate the properties and behaviour of carpet samples made from fibers produced by the practice of the present invention, and of samples made via other methods as comparative examples. In particular, a standard test is used to evaluate the stain resistance of samples. It involves the use of an acidified solution of FD & C Red 40 dye, which is present in the soft drink cherry flavoured Kool-Aid®, commercially sold by Kraft General Foods Inc. These test methods are described below.

Red 40 Stain Test 0.1000 g±0.0030 g of FD&C Red 40 dye (Cl Food Red 17) is dissolved in 1000 cc of distilled water. The pH of the dye solution was adjusted to between 2.80 and 2.90 by making small additions of technical grade citric acid. The pH adjusted solution was allowed to reach ambient temperature, i.e. 21° C.±1° C. prior to use. The carpet sample was laid on a hard, flat, non-porous surface. 50 ml±1 ml of the Red 40 dye solution was poured into a 2" ring placed on the carpet. A plunger was inserted into the ring and was moved up and down five times, without rotation, to ensure that the application of the solution was even and the fibers were fully wetted. The ring was removed and the carpet was left to air dry for 24 hours at ambient temperature. The carpet was then washed with running mains water of a temperature of 45° C.±5° C. for 2 minutes. As much as possible of the water was removed using a vacuum extractor. The carpet was then left for a further 24 hours to air dry at ambient temperature. If red dye wicked to the surface of the carpet during this drying period, then the washing steps indicated above were repeated. The stain resistance of the carpet face yarn was determined by visual comparison to the AATCC Red 40 Stain Scale, which is available from the American Association of Textile Chemists and Colorists (AATCC), Research Triangle Park, North Carolina. The scale consists of ten transparent film squares colored with gradually increasing strengths of FD&C Red 40 numbered from 1 to 10, with 1 being the strongest color and 10 being colorless. A sample of the unstained carpet was placed underneath the colored portions of the scale and the stained carpet was placed underneath the colored portion of the scale and viewed under daylight or equivalent illuminant.

The light should be incident upon the surfaces at an angle of 45°±5° and the viewing direction should be 90°±5° to the plane of the surfaces. The stained carpet was compared to the unstained carpet placed under the closest numbered colored square of the stain scale so that the best color match was obtained. If the color of the stained carpet fell between two squares, then half grades were given. The number of this colored square, or squares if the match fell between two squares, is called the Stain Rating.

Carpet Wear Testing

Tufted carpet was tested per ASTM Test Method D5252-92 to 50,000 revolutions at 70° F. and 50% R.H. An Electrolux upright vacuum cleaner model LXE was used to vacuum the carpet after the test and before grading. The carpet was not vacuumed after every 2000 revolutions as detailed in the ASTM test method. The worn carpet samples were graded using the Carpet and Rug Institute Reference Scale A. This scale consists of four photographs numbered from 1 to 4 showing gradually increasing degrees of wear, appearance deterioration or matting. A grade of 1 indicates a badly worn sample. A grade of 5 indicates that no wear has occurred. If the tested sample falls between two photographs, then a half grade is given. This test is known by those of ordinary skill in the art to simulate human foot traffic; one revolution of the test drum is considered to be equivalent to 8–12 foot traffics.

Soiling Test

Tufted carpet was tested for soiling using a similar apparatus to that used for the carpet wear test described above. 1.5000±0.0020 g of SPS-2001 Standard Carpet Dry Soil, available from 3M, St. Paul Minn., was sprinkled evenly over a carpet sample of dimensions 25.5" by 8.25" using a fine sieve. The carpet was carefully placed inside the test drum and 150 soil-free flint pellets, each weighing 5.03±0.03 g, were added to the drum. The lid of the drum was secured and the drum was placed on the drum roller. The drum was rolled for 500 rotations, which is called one soiling cycle. The carpet was then removed from the drum and vacuumed with the handheld Beaterbar of an Electrolux upright vacuum cleaner model LXE. The soiled and vacuumed carpet was graded using the MTCC Grey Scale for Staining. The scale consists of ten pairs of grey rectangles, the pairs representing progressive differences in color or contrast. The scale runs form 1 to 5 in half unit grades, with a value of 1 indicating gross change in color or contrast, and 5 being no color or contrast change. The test may be repeated as desired to evaluate the effect of multiple soiling cycles.

The soiled carpets were then evaluated for ease of cleaning with hot mains water (55° C.±5° C.) using the Deluxe Hand Tool of a Windsor® Passport™ wet extractor (carpet cleaner) supplied by Windsor Industries Inc., Eaglewood, Colo. No detergent or other cleaning agent other than water is used in the evaluation. Five passes of the Hand Tool using the water spray and wet extraction were done in opposite directions over the carpet. The carpet is then left for 24 hours to air dry at ambient temperature before grading using the AATCC Grey Scale for Staining.

Colorfastness to Oxides of Nitrogen Test

Colorfastness to oxides of nitrogen was tested using AATCC Test Method 164-1997, for 1, 3 and 5 cycles, at a temperature of 40° C.±1° C. and a relative humidity of 87.5±2.5%.

Accelerated Ultraviolet (UV) Light Weathering

Colorfastness to UV light was tested using AATCC Test Method 16, Option E. The face yarn side (front) of the carpet sample was exposed. The back of the carpet sample was covered (backed) to prevent exposure. The acceptance of the result was not compared to a reference sample, the exposed part of the specimen being compared to the masked portion of the specimen. The colorfastness to light rating was determined using the AATCC Grey Scale for Color Change. The ambient (dry bulb) temperature was 43° C.±2° C., the black panel temperature was 63° C.±1° C. and the relative humidity was 30%±5%. The exposure was controlled by the AATCC Blue Wool Lighffastness Standard L4. The radiant energy was 170 kJ with an elapsed exposure time of 85 hours. The type of test apparatus was a xenon-arc, manufactured by Atlas Electric Devices Co., Model No. 65-WR, Serial No. XE-523FC, with a two-tier specimen rack and a distilled water supply.

Bleach Test.

The carpet was laid on a hard, flat non-porous surface. 20 ml±1 ml of Clorox® (a registered trademark of The Clorox Company, Oakland Calif.) regular bleach, containing 5.25% of sodium hypochlorite and 94.75% of inert ingredients, was poured into a 2" ring placed on the carpet. A plunger was inserted into the ring and was moved up and down five times, without rotation, to ensure that the Clorox application was even and the fibers are fully wetted. The ring was removed and the carpet was left to air dry for 24 hours at ambient temperature. The carpet was then washed with running water of a temperature of 45° C.±5° C. for two minutes. As much as possible of the water was removed with a vacuum extractor. The carpet was then left for a further 24 hours to air dry at ambient temperature. The carpet was then graded using the AATCC Grey Scale for Color Change.

Reagent Extraction Test 5.0000 g±0.0010 g of yarn was placed in 100 ml of methanol in a pre-weighed round-bottomed flask, which was fitted with a condenser. The methanol was heated to boiling reflux for 16 hours. After cooling to ambient temperature, the yarn was removed from the methanol and washed with a further two 50 ml aliquots of methanol, which were added to the flask containing the refluxed methanol. The methanol in the flask was evaporated to dryness. The weight of any residue was then determined. The limit of detection of residue via this technique was determined to be 0.3% wt.

EXAMPLES

The invention is illustrated by the following, non-limiting, examples.

The following yarn spinning, draw-texturing and carpet tufting methods were applied to the examples.

Yarn Spinning

Undrawn yarns were spun using an unvented melt spinning extrusion system of a type and configuration known to those skilled in the art. The polymer melt was filtered through a screen pack containing a 50×250 mesh screen and metered to a 60 hole die with trilobal (Y) shaped holes. The 60 filaments produced were separated into 2×30 filament bundles, spin finish applied, and the two bundles wound up onto separate winders to produce undrawn yarn with a denier of 1850 g per 9000 m length with a filament count of 30 ("1850/30Y").

Yarn Draw-Texturing 4 ends of the 1850130Y undrawn yarns produced were cotextured using mechanical crimp draw-texturing at a draw ratio of 3.6 to give a 2400/120Y bulked continuous filament (BCF) yarn.

Carpet Tufting

The BCF yarn was tufted into a $1/10^{th}$ gauge, $3/16$ inch pile height level loop carpet construction and backed with a latex backing, to give an approximate yarn face weight of 20 oz. In the course of the development work carried out in pursuance of the present invention it has been found that different types of backing may result in different properties of the face yarn of the carpet, including wear and stain resistance performance. In the examples given below, the same latex backing has been used throughout. The latex is STIX 320® Custom Rug Laminating Adhesive supplied by XL Corp., Calhoun, Ga.

Examples 1 to 4 (Comparative Examples)

A sulfonated polyamide 6,6 resin, polymerized from the nylon salt of adipic acid and hexamethylene diamine, with 5-sodiosulfoisophthalic acid, containing 2300 ppm of sulfur, with an RV=2.7, similar to that described in U.S. Pat. No. 5,108,684, and a moisture level of 650 ppm, was melt spun, drawn and textured. A formulated pigment concentrate containing various pigments was added during the melt spinning stage to give the yarn a beige coloration ("Light Wheat"). A copper/iodide based stabilizer was also added. 0.3% oil on yarn of Lurol NF-6239 spin finish, supplied by Goulston Technologies, Monroe, N.C., was applied to the yarn with various levels of Scotchguard FC-248, a fluorinated soil-proofing agent supplied by 3M, St. Paul, Minn. The level of spin finish was determined by a Fourier-Transform Infra-Red (FTIR) method. The amount of fluorine on the yarn was determined by a combustion method. The yarns were tufted into carpet and tested for Red 40 staining, soiling, wear, colorfastness to oxides of nitrogen and accelerated UV weathering. The results are given in Table 1.

Example 5

A polyamide 6,6 resin, polymerized from the nylon salt of adipic acid and hexamethylene diamine, with an RV=3.2, an AEG level of 27 equivalents per $10^6$ g and a moisture level of less than 500 ppm was melt compounded with 10 wt % of the lithium salt of 5-sulfoisophthalic acid also dried to a moisture level of 170 ppm. The melt compounding was carried out in a 40 mm co-rotating twin-screw extruder with a length-to-diameter ratio of 24:1 which was vented with vacuum assistance of 22 inHg. The concentrate strand produced from the extrusion process was extremely brittle and difficult to pelletise. The RV of the polyamide-based concentrate was 2.0. 20 wt % of this polyamide-based concentrate was added to the same polyamide resin feedstock used to make the concentrate and melt spun, drawn and textured. 0.3% oil on yarn of Lurol NF-6239 spin finish containing 0.13% of Scotchguard FC-248 was applied to the yarn. The yarn produced was tufted into carpet and tested for Red 40 staining. The stain rating of the face yarn on the carpet was 4.0.

Example 6 (Comparative Example Showing the Poor Stain Resistance of Unsulfonated Polyamide)

The same polyamide 6,6 used in Example 5 was melt spun, drawn and textured without any addition of sulfur in any form. 0.3% oil on yarn of Lurol NF-6239 spin finish containing 0.13% of Scotchguard FC-248 was applied to the yarn. The yarn produced was tufted into carpet and tested for Red 40 staining. The stain rating of the face yarn on the carpet was 4.0.

Example 7 (Comparative Example Showing That Addition of PET to Sulfonated Copolyamide Does Not Provide Surprising or Unexpected) Results)

10 wt % of PET with an IV=0.67 and pre-dried to a moisture level of less than 50 ppm was added to the sulfonated polyamide 6,6 resin of Examples 1–4 and melt spun, drawn and textured. 0.3% oil on yarn of Lurol NF-6239 spin finish containing 0.13% of Scotchguard FC-248 was applied to the yarn. A formulated off-white pigment concentrate ("Ceiling White") containing copper/iodide stabiliser was also added during the spinning process. The yarns were tufted into carpet and tested for Red 40 staining, soiling, wear, colourfastness to oxides of nitrogen and accelerated UV weathering. The results are given in Table 2. No unexpectedly improved soiling resistance was noted.

Example 8 (Comparative Example Showing That Addition of PBT to Sulfonated Copolyamide Does Not Provide Surprising or Unexpected Results)

10 wt % of PBT pre-dried to a moisture level of 80 ppm was added to the pre-dried sulfonated copolyamide resin of Examples 1–4 and melt spun, drawn and textured. 0.3% oil on yarn of Lurol NF-6239 spin finish containing 0.13% of Scotchguard FC-248 was applied to the yarn. The same Ceiling White pigment concentrate containing copper/iodide stabiliser as used in Example 7 was also added during the spinning process. The yarns were tufted into carpet and tested for Red 40 staining, soiling, wear, colorfastness to oxides of nitrogen and accelerated UV weathering. The results are given in Table 2.

Example 9 (Comparative Example Showing That the Addition of PET to Unsulfonated Polyamide Does Not Provide Surprising or Unexpected Results)

10 wt % of the PET of Example 7 was added to the pre-dried (unsulfonated) polyamide 6,6 resin of Example 5 and melt spun, drawn and textured. 0.3% oil on yarn of Lurol NF-6239 spin finish containing 0.13% of Scotchguard FC-248 was applied to the yarn. The same Ceiling White pigment concentrate containing copper/iodide stabiliser of Example 7 was also added during the spinning process. The yarn produced was tufted into carpet and tested for Red 40 staining. The stain rating of the face yarn on the carpet was 4.5.

Example 10 (Comparative Example Showing That the Addition of PBT to Unsulfonated Polyamide Does Not Provide Surprising or Unexpected Results)

10 wt % of the PBT of Example 8 was added to the pre-dried (unsulfonated) polyamide 6,6 resin of Example 5 and melt spun, drawn and textured. 0.3% oil on yarn of Lurol NF-6239 spin finish containing 0.13% of Scotchguard FC-248 was applied to the yarn. The same Ceiling White pigment concentrate containing copper/iodide stabiliser of Example 7 was also added during the spinning process. The yarn produced was tufted into carpet and tested for Red 40 staining. The stain rating of the face yarn on the carpet was 4.5.

Examples 11 to 14

Four different concentrates were prepared using as carrier resins PET, PBT, PTT and PETG. Each of these four concentrates were prepared and evaluated in a fiber-forming polyamide resin in the following manner. The polyester and 5-sodiosulfoisophthalic acid (50:50 weight basis) of a moisture level of less than 1000 ppm were melt compounded in a 30 mm twin-screw extruder with a length to diameter ratio of about 30:1 which was vented with vacuum assistance of between 15 and 20 in Hg. Continuous strand was produced from the extruder that was easy to pelletise. The concentrates thus produced were dried to a moisture level of less than 100 ppm, except for the concentrate using the PETG carrier resin which was dried to a moisture level of 450 ppm. Concentrate was added to the (unsulfonated) polyamide 6,6 resin of Example 5 during the melt spinning process. The same Ceiling White pigment concentrate containing copper/iodide stabiliser of Example 7 was also added during the spinning process. The undrawn yarn produced was draw-textured. 0.3% oil on yarn of Lurol NF-6239 spin finish containing 0.13% of Scotchguard FC-248 was applied to the yarn. The yarns were tufted into carpet and tested for Red 40 staining, soiling, wear, colorfastness to oxides of nitrogen and accelerated UV weathering. Example 11 yarn was prepared using concentrate with PETG carrier resin. Example 12 yarn was prepared using concentrate with PBT carrier resin. Example 13 yarn was prepared using concentrate with PTT carrier resin. Example 14 yarn was prepared using concentrate with PET carrier resin. The results are given in Table 2.

The yarns produced in Examples 11 to 14 were subjected to the Reagent Extraction Test described above. No residue was recorded for these four examples.

Example 15 (Further Comparative Example)

The sulfonated polyamide 6,6 resin of Example 1 was melt spun with the same Ceiling white pigment concentrate containing copper/iodide stabiliser as Examples 10 to 13 and the undrawn yarn then draw-textured. 0.35 oil on yarn of Lurol NF6239 spin finish containing 0.13% of Scotchguard FC-248 was applied to this yarn. The yarns were tufted into carpet and tested for Red 40 staining, soiling, wear, colorfastness to oxides of nitrogen and accelerated UV weathering. The results are given in Table 2. The yarn was subjected to the Reagent Extraction Test described above. No residue was recorded for this example.

Example 16 (Further Comparative Example)

The unsulfonated polyamide 6,6 resin of Example 5 was melt spun with the same Ceiling White pigment concentrate containing copper/iodide stabiliser of Example 7 and the undrawn yarn draw-textured. 0.3% oil on yarn of Lurol NF-6239 spin finish containing 0.13% of Scotchguard FC-248 was applied to the yarn. The yarns were tufted into carpet and tested for Red 40 staining, soiling, wear, colorfastness to oxides of nitrogen and accelerated UV weathering. The results are given in Table 2. The yarn was subjected to the Reagent Extraction Test described above. No residue was recorded for this example.

Example 17

A concentrate containing PBT of IV=0.80 and 5-sodiosulfoisophthalic acid in a 50:50 weight basis was melt compounded on a 40 mm fully intermeshing twin-screw extruder with an length:diameter ratio of about 34:1. The PBT was dried to a moisture level of less than 500 ppm, whereas the 5-sodiosulfoisophthalic acid was dried to a moisture level of between 1500 and 2000 ppm. The PBT and the 5-sodiosulfoisophthalic acid were fed separately to the extruder using gravimetric feeders. The barrel was vented with vacuum assistance of 21 in. Hg. The average dwell time of the compounding mixture in the extruder barrel was about 90 seconds. The screw speed was set at 250 rpm with an extruder output of about 125 lbs/hour. The extruder temperature profile for the six heated zones along the extruder barrel were set to 210° C./230° C./250° C./250° C./250° C./250° C. These extruder conditions gave a melt temperature at the end of the extruder barrel of 252° C. The melt strands emerging from the die were cooled and solidified through a water bath prior to pelletization using a strand pelletizer.

The concentrate pellets produced were ground to a fine powder and extracted with methanol using a Soxhlet type apparatus for 16 hours. The methanol was evaporated from the extractable material by drying on a rotary evaporator. The extracted material was a white powder. 49.6% wt. of this white powder was extracted from the concentrate. The FTIR spectrum of the extracted material was similar to that of the 5-sodiosulfoisophthalic acid feedstock.

The concentrate was dried to a moisture level of between 100 to 150 ppm prior to addition to polyamide 6,6 resin other additives, spinning and texturing processes described in Examples 11 to 14, except 0.35% oil on yarn of Goulston Lurol NF-7063 spin finish containing 0.13% wt. of Scotchguard FC-354 was applied to the yarn in place of the NF-6239/FC-248 finish application. The yarn was tufted into carpet prior to evaluation. The results of the carpet evaluation are included in Table 2.

Example 18

A polyamide 12 resin supplied by Elf Atochem under the grade name Rilsan AESNO TL was melt compounded with 33% wt. of 5-sodiosulfoisophthalic acid on a vacuum vented 43 mm twin-screw extruder at a melt temperature of 197° C. with a vacuum vent level of 26.5 in. Hg. Both the resin and the salt were dried to less than 200 ppm moisture level prior to compounding. The concentrate formed was dried to 400 ppm moisture level and was blended with the same dried polyamide 6,6 resin used in Example 5 a ratio of 9/94 ratio by weight. The blend was melt spun to through a 136 hole spinneret with a round cross-section to give a total filament bundle denier of 4600. The natural spun yarn was hot drawn at a 3.6 draw ratio. The drawn yarn had a tenacity of 3.5 g/denier and % elongation at break of 20%. 1 gram of the yarn was soaked in 50 mls of Red 40 dye solution prepared as previously described in the "Red 40 Stain Test", for 1 hour. The yarn was then rinsed under tap water at about 115° F. for 1 minute. After allowing the yarn to dry, the degree of staining was evaluated using the AATCC Red 40 Stain Scale. The stained yarn had a stain rating of 8.5.

The concentrate pellets produced were ground to a fine powder and extracted with methanol using a Soxhlet type apparatus for 16 hours. The methanol was evaporated from the extractable material by drying on a rotary evaporator. The extracted material was a white powder. 32.8% wt. of this white powder was extracted from the concentrate. The FTIR spectrum of the extracted material was similar to that of the 5-sodiosulfoisophthalic acid feedstock.

Example 19

A polyamide 6/6,6/6,12 terpolymer supplied by Elf Atochem under the grade name Platamid H30 was dried for 15 hours at 91° C. dryer setpoint under desiccant air atmosphere. This resin was melt compounded with 25% wt. of 5-sodiosulfoisophthalic acid on a vacuum vented twin-screw extruder at a melt temperature of 195° C. with a vacuum of 26.5 in. Hg. The moisture level of the salt was less than 400 ppm prior to compounding. The concentrate produced was dried to less than 400 ppm before melt spinning and drawing per Example 18 with the same polyamide 66 resin. The drawn yarn had a tenacity of 3.8 g/denier with a % elongation at break of 26%. The drawn yarn was stained with Red 40 dye as described in Example 18. The stain rating was 9.0.

TABLE 1

| Example Number | Fluorine level/ppm | Red 40 Stain Rating | Wear Appearance Rating | Bleach Color Change Rating | UV Light Weathering Rating | Soil Resistance Ratings | | | | | | Colorfastness to NOx | | |
|---|---|---|---|---|---|---|---|---|---|---|---|---|---|---|
| | | | | | | 1 cycle dry vacuum | 1 cycle wet extraction | 3 cycles dry vacuum | 3 cycles wet extraction | 5 cycles dry vacuum | 5 cycles wet extraction | 1 cycle | 3 cycles | 5 cycles |
| 1 | none | 9.0 | 4.0 | 5.0 | 5.0 | 3.5 | 4.5 | 3.0 | 4.0 | 2.5 | 3.5 | 5.0 | 4.5 | 4.0 |
| 2 | 120 ± 50 | 9.0 | 3.0 | 5.0 | 3.0 | 3.5 | 5.0 | 2.5 | 4.5 | 2.5 | 4.0 | 5.0 | 4.0 | 3.5 |
| 3 | 198 ± 50 | 9.0 | 3.0 | 5.0 | 5.0 | 3.5 | 5.0 | 2.5 | 4.5 | 2.5 | 4.0 | 5.0 | 4.0 | 3.5 |
| 4 | 385 ± 50 | 9.0 | 4.0 | 5.0 | 5.0 | 3.5 | 5.0 | 2.5 | 4.5 | 2.5 | 4.0 | 5.0 | 4.0 | 3.5 |

TABLE 2

| Example Number | Fluorine level/ppm | Red 40 Stain Rating | Wear Appearance Rating | Bleach Color Change Rating | UV Light Weathering Rating | Soil Resistance Ratings | | | | | | Colorfastness to NOx | | |
|---|---|---|---|---|---|---|---|---|---|---|---|---|---|---|
| | | | | | | 1 cycle dry vacuum | 1 cycle wet extraction | 3 cycles dry vacuum | 3 cycles wet extraction | 5 cycles dry vacuum | 5 cycles wet extraction | 1 cycle | 3 cycles | 5 cycles |
| 7  | 120 ± 50 | 8.5 | 3.0 | 5.0 | 5.0 | 3.5 | 5.0 | 2.5 | 4.5 | 2.5 | 4.5 | 5.0 | 4.0 | 3.5 |
| 8  | 120 ± 50 | 9.0 | 3.0 | 5.0 | 5.0 | 4.0 | 5.0 | 2.5 | 4.5 | 2.5 | 4.5 | 5.0 | 4.0 | 3.5 |
| 11 | 120 ± 50 | 9.5 | 4.0 | 5.0 | 4.5 | 4.0 | 4.5 | 3.5 | 4.5 | 3.5 | 4.5 | 5.0 | 5.0 | 5.0 |
| 12 | 120 ± 50 | 9.5 | 4.0 | 5.0 | 4.5 | 4.0 | 4.5 | 3.5 | 4.5 | 3.5 | 4.5 | 5.0 | 4.5 | 4.5 |
| 13 | 120 ± 50 | 9.5 | 4.0 | 5.0 | 4.5 | 4.0 | 4.5 | 3.5 | 4.5 | 3.5 | 4.5 | 5.0 | 4.5 | 4.5 |
| 14 | 120 ± 50 | 9.5 | 4.0 | 5.0 | 4.5 | 4.0 | 4.5 | 3.5 | 4.5 | 3.5 | 4.5 | 5.0 | 4.5 | 4.5 |
| 15 | 120 ± 50 | 9.0 | 4.0 | 5.0 | 4.5 | 3.5 | 4.5 | 3.0 | 4.0 | 2.5 | 4.0 | 4.5 | 3.5 | 2.5 |
| 16 | 120 ± 50 | 5.0 | 4.0 | 5.0 | 4.5 | 3.5 | 4.5 | 3.0 | 4.0 | 2.5 | 3.5 | 5.0 | 4.5 | 4.5 |
| 17 | 120 ± 50 | 9.5 | 4.0 | 5.0 | 4.5 | 4.5 | 4.5 | 4.0 | 4.5 | 4.0 | 4.0 | 5.0 | 5.0 | 4.5 |

I claim:

1. An acid dye stain-resistant and soil resistant fiber-forming polyamide composition comprising:
   (a) a fiber-forming polyamide, and
   (b) a concentrate including both a melt-compounded blend of a thermoplastic polyamide and a reagent including a sulfonated aromatic acid at least a portion of which associates with free acid sites in said fiber-forming polyamide, thereby disabling said acid dye sites in fibers formed from said composition from taking up acid dye stains.

2. A composition as defined in claim 1 wherein said sulfonated aromatic acid is a derivative of sulfoisophthalic acid.

3. A composition as defined in claim 2 wherein said derivative of a sulfoisophthalic acid is a metal salt of sulfoisophthalic acid.

4. A composition as defined in claim 3 wherein said metal salt of 5-sulfoisophthalic acid comprises a metal salt including a metal selected from the group consisting of an alkaline metal and an alkaline earth metal.

5. A composition as defined in claim 3 wherein said metal salt comprises a lithium salt of 5-sulfoisophthalic acid.

6. A composition as defined in claim 3 wherein said metal salt comprises a sodium salt of 5-sulfoisophthalic acid.

7. A composition of claim 1 wherein said sulfonated aromatic acid comprises a compound selected from the group consisting of 3-sulfobenzoic acid, a sodium salt of 3-sulfobenzoic acid, and a lithium salt of 3-sulfobenzoic acid.

8. A composition as defined in claim 1 wherein said fiber-forming polyamide comprises a polyamide selected from the group consisting of polyamide 6, polyamide 6,6, copolymers of polyamide 6 and polyamide 6,6, polyamide 6,12, polyamide 6,9, polyamide 11, polyamide 12, and mixtures thereof.

9. A composition as defined in claim 1 wherein said fiber-forming polyamide has a relative solution viscosity between about 2.0 and about 4.0.

10. A composition as defined in claim 1, wherein said fiber-forming polyamide has an amine end group level of less than about 50 equivalents per $10^6$ g.

11. A composition as defined in claim 1 wherein said fiber-forming polyamide has an amine end group level of less than about 30 equivalents per $10^6$ g.

12. A composition as defined in claim 1 wherein said thermoplastic polyamide is selected from the group consisting of polyamide 6, polyamide 6,6, copolymers of polyamide 6 and polyamide 6,6, polyamide 6,12, terpolymers of polyamide 6, 6,6 and 6,12, polyamide 6,9, polyamide 11, polyamide 12, poly(trimethylhexamethylene terephthalamide), and mixtures thereof.

13. A composition as defined in claim 1 further comprising an adjuvant.

14. A composition as defined in claim 13 wherein said adjuvant comprises an adjuvant selected from the group consisting of an antioxidant, a stabiliser, a colorant, a processing aid, a nucleating agent, an antimicrobial, an antistatic additive, an antiozonant, a lubricant, a stainproofing agent, a soilproofing agent, a melt viscosity enhancer, a flame retardant, and a mixture thereof.

15. A composition as defined in claim 1 wherein said concentrate includes from about 10 to about 65% by weight of said sulfonated aromatic acid.

16. A composition as defined in claim 1 wherein said composition comprises between about 1000 ppm and about 3000 ppm sulfur.

17. A fiber formed from the composition of claim 1.

18. A carpet or floorcovering comprising the fiber of claim 17.

19. A textile article comprising the fiber of claim 17.

* * * * *